H. L. IDE.
ANIMAL OPERATED LIQUID DISTRIBUTER.
APPLICATION FILED MAR. 11, 1915.
1,151,524.
Patented Aug. 24, 1915.
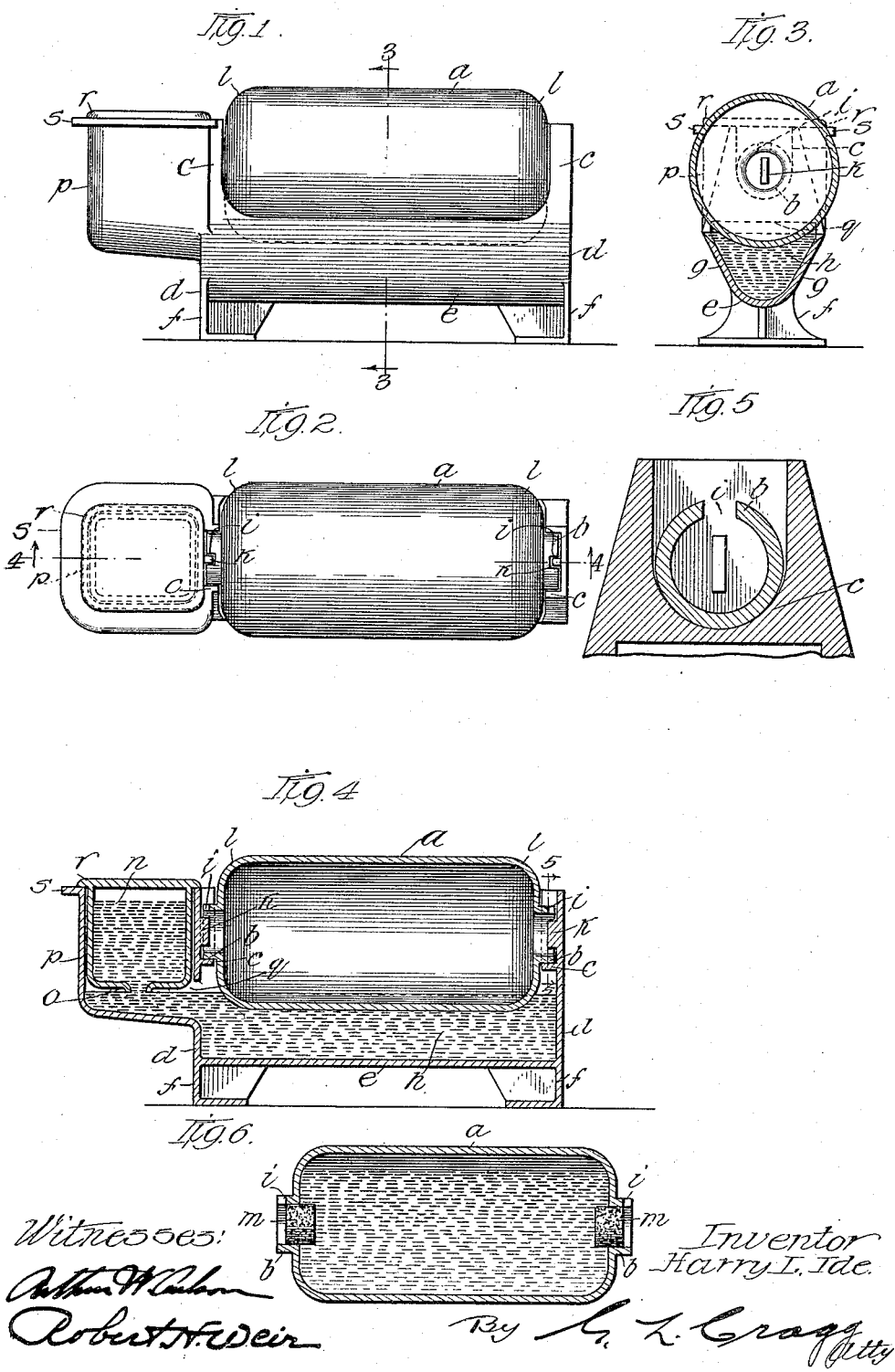

UNITED STATES PATENT OFFICE.

HARRY L. IDE, OF SPRINGFIELD, ILLINOIS.

ANIMAL-OPERATED LIQUID-DISTRIBUTER.

1,151,524.      Specification of Letters Patent.      Patented Aug. 24, 1915.

Application filed March 11, 1915. Serial No. 13,566.

*To all whom it may concern:*

Be it known that I, HARRY L. IDE, citizen of the United States, residing at Springfield, in the county of Sangamon and State of Illinois, have invented a certain new and useful Improvement in Animal-Operated Liquid-Distributers, of which the following is a full, clear, concise, and exact description, reference being had to the accompanying drawings, forming a part of this specification.

My invention relates to devices which may be operated by animals, such as hogs, to cause such devices to apply suitable oil or other liquid to the skin of the animals to rid them of vermin and otherwise contribute to their comfort, claims being herein included that relate to certain characteristics disclosed but not claimed in my Patent 1,096,244, dated May 12, 1914, and which were required by the Patent Office to be embraced in an application distinct from that upon which said patent was granted. The structure disclosed herein and in my aforesaid patent embraces a horizontally mounted roller sufficiently overhanging longitudinal sides of an underlying trough to enable the hog to have such access to the roller as readily to roll it to oil his body without the necessity of climbing upon the device.

In accordance with one feature of the invention herein claimed the trough is further supplied from a reservoir which is so related to the trough as not to interfere with the approach of the animal to the roller at either longitudinal side of the trough. In the preferred form of the invention the reservoir is provided with a lower discharge opening terminating at a predetermined level at which the liquid within the trough is to be maintained whereby there is constituted a barometric feed serving to maintain the level of oil in the trough substantially constant. This reservoir is preferably in the form of an inverted bottle outwardly flanged or projected to enable it to be supported upon the upper edge of a bottle container, which container is in communication with the trough in the region of the normal level of the oil in the trough. To prevent the hog from lifting the bottle by rubbing against the outsetting projections or flanges provided upon the bottle, the bottle container is outwardly projected in the region of the outsetting bottle projections to guard the bottle from being rubbed against by the hog. In this way the normal level of the liquid in the trough is not disturbed and such liquid is not wasted.

I will explain my invention more fully by reference to the accompanying drawing in which—

Figure 1 is a side view of the structure; Fig. 2 is a plan view partially in section; Fig. 3 is a vertical section on line 3 3 of Fig. 1; Fig. 4 is a longitudinal section on line 4 4 of Fig. 2; Fig. 5 is a vertical section on line 5 5 of Fig. 4; and Fig. 6 is a longitudinal section of the roller showing its use as a container, the drawing showing but one embodiment of the invention.

Like parts are indicated by similar characters of reference throughout the different figures.

The horizontally mounted roller $a$ is provided with trunnion projections $b$ at its ends, these projections being substantially co-axial with the roller. The trunnions $b$ are supported by the bottom parts of the insetting pockets $c$ which are formed in the upper extensions of the end walls $d$ of a trough $e$. The trough is provided with a suitable foundation structure $f$. The longitudinal side walls $g$ of the trough $e$ are disposed below the horizontal plane passing through the axis of the roller $a$. The horizontal plane in which the upper margins of the side walls $g$ are included also preferably includes the chord subtending an arc of, say 70°, of the circle of the roller $a$ whereby less than one-fifth of the roller is projected into the disinfecting liquid $h$ in the trough. 55° of the roller circle thus intervene between each end of the horizontal diameter of such circle and the intervening segment of the roller which is immersed within the liquid, the sides of the roller thus well overhanging the underlying trough. The hog thus has opportunity to rub against the lower half of the roller thereby readily to effect its rotation, means being provided for preventing the hog from materially lifting the roller out of the trough as it rapidly revolves the roller. To this end the trunnions are desirably made hollow, a slot $i$ (extending longitudinally of the roller) extending through each trunnion to permit of the passage of insetting vertically elongated or upright lugs *k* (cast upon the trough structure and extending short distances into the pockets *c*) when the roller is to be mounted within its bearings. The slots *i* are but a trifle wider than the width of the upright lugs *k* so that in all positions of the roller, excepting that which the roller is caused to assume for the purpose of its assembly or removal, the slots *i* cannot be passed over the lugs *k* whereby the roller cannot well be dislodged as it is being rapidly turned. The lugs *k* are sufficiently shorter than the internal diameters of the hollow trunnions *b* and are so disposed with respect to the pockets *c* as always to permit limited bodily elevation of the roller, a feature which is of advantage when taken in conjunction with a trough whose liquid holding space completely underlies the axis of rotation of the roller, since any water that may have been caught in the trough cannot, in freezing, burst the machine by the upward pressure which the freezing water would exert upon the roller.

The low trough has the additional advantage of having the upper edges of the side walls *g* thereof sufficiently removed from the hog as ordinarily to prevent it from scraping mud and dirt from its body into the trough, thereby consequently preventing the trough from being choked. The external surface of the roller itself is smooth, to prevent the roller from scraping dirt from the hog, the smooth surface of the roller also avoiding irritation of the skin. The ends of the cylindrical roller are rounded at *l*, the entire roller thus being of a formation which will enable it, as it is being turned, to transfer oil or other liquid to various portions of the body of the hog, the rounded ends of the roller being particularly adapted to transfer the oil to the ear and shoulder portions of the animal.

As the manufacturer may wish to supply the consumer with an initial quantity of oil or other suitable liquid, I preferably make the roller hollow to act as a container for such oil, in which event the roller is desirably made of metal. The bore of either or each of the hollow trunnions *b* is inwardly extended to have communication with the interior of the roller so that the liquid may be poured through either or each end of the roller into the roller interior, each hollow trunnion being corked at *m* (Fig. 6), these corks not interfering with the machine after its assembly for shipment and being readily withdrawn at the point of destination to permit of the discharge of the entire roller contents to the trough. The roller *a* thus constitutes a bottle and the trunnions *b* constitute bottle necks through which bottle contents are taken and discharged.

Enough oil or other liquid may be contained in the roller *a* to fill the trough. A reservoir for an additional quantity of such oil or other liquid for replenishing the oil in the trough and maintaining the oil level in the trough substantially constant is preferably provided. This reservoir desirably consists of a removable inverted bottle *n* whose discharge neck *o* terminates at the level of the oil in the trough when the bottle *n* is in position. As the oil is removed from the trough, the oil in the trough is correspondingly replenished by oil from the bottle *n* which flows out of the bottle until the level of oil in the trough reaches and seals the bottle neck.

The container or support *p* for the bottle is desirably cast integrally with the trough, the interior of the container having communication at *q* with the trough below the normal level of the oil in the trough, the passage at *q* also extending above this oil level, the whole arrangement being such that the oil may readily flow between the bottom of the bottle container and the trough. The reservoir or bottle *n* is positioned in the vertical plane that includes the axis of the roller, and preferably at one end of the trough, and therefore does not interfere with the approach of the animal to either side of the roller, the reservoir structure (inclusive of the reservoir and the neighboring part of its support) being preferably of lesser width than the roller to permit both sides of the roller structure to extend laterally of the roller clear of the reservoir structure to enable the roller to be reached throughout its length at both sides thereof by animals intending the use of the device.

In carrying out my invention the reservoir is herein shown as being located at one end of the trough and in alinement with the axis of the roller.

The end wall of the bottle *n* opposite the bottle mouth *o* is desirably outwardly flanged or projected as indicated at *r* (the bottle *n* being preferably made of cast iron) the outsetting projections *r* of the bottle resting upon the top edge of the container so as to position the lower end of the bottle neck *o* at the proper level of the oil in the trough. It has been found that the animal, after having transferred a quantity of oil from the rotating roller to his skin, will go to the bottle container to rub his body against it to spread and rub in the oil.

To prevent the animal from engaging the flange *r* in this operation, the bottle container is provided with outsetting projections or flanges *s* extending outwardly beyond the outsetting projections *r*, the outsetting projections *s* thus preventing the animal from reaching the projections *r*. Thus the level of the bottle cannot be disturbed by the hog whereby the level of the oil in the trough is maintained constant as long as there is a supply in said bottle and, further, the oil is thus not wasted.

Having thus described my invention I claim as new and desire to secure by Letters Patent the following:

1. A device for enabling an animal to apply liquid to its skin including a liquid holding trough; a roller operable by an animal and serving when turned to transfer liquid from the trough to the animal; a reservoir for holding an additional supply of liquid and having a lower discharge opening communicating with the trough interior and terminating at the level desired to be maintained in the trough to maintain the level of the liquid supply substantially constant; and a reservoir support provided in the region of the roller, the upper end of the reservoir being outwardly extended to engage the reservoir support, thereby to be supported, while the reservoir support projects beyond the reservoir where it is outwardly extended to prevent the animal from engaging the reservoir, where outwardly extended, and moving the reservoir.

2. A feeding device and support for an animal operated liquid distributer, comprising a supporting base, a trough thereon, bearings projecting upwardly from the trough adapted to support a distributer, and a reservoir container adjacent to one of said bearings adapted to feed into the trough, in combination with a reservoir communicating with the container and housed thereby to protect the same from the animal.

3. A feeding device and support for an animal operated liquid distributer, comprising a supporting base, a trough thereon, bearings projecting upwardly from the trough adapted to support a distributer, a reservoir container adjacent to one of said bearings adapted to feed into the trough, in combination with a reservoir communicating with the container and housed thereby to protect the same from the animal, and a cover portion for the reservoir having its edges formed and arranged relative to the container to prevent engagement of said edges by the animal.

4. A feeding device and support for an animal operated liquid distributer, comprising a supporting base, a trough thereon, bearings projecting upwardly from the trough adapted to support a distributer, a reservoir container adjacent to one of said bearings adapted to feed into the trough, in combination with a reservoir communicating with the container and housed thereby to protect the same from the animal, and a cover portion for the reservoir having its edges formed and arranged relative to the container to prevent engagement of said edges by the animal, said cover portion consisting of an integral flange at the top of the reservoir adapted to engage a complementary part of the container.

5. A device for enabling an animal to apply liquid to its skin including a liquid holding trough, a roller structure for transferring liquid from the trough to the skin of an operating animal, and a reservoir having means for supplying liquid to the trough and of lesser width than the roller and located adjacent to said roller, and arranged to have both sides of said roller extend laterally beyond the reservoir.

6. A device for enabling an animal to apply liquid to its skin including a liquid holding trough, a roller structure for transferring liquid from the trough to the skin of an operating animal and overhanging both longitudinal sides of the trough in combination with a reservoir having means for supplying liquid to the trough, said reservoir being of lesser width than the roller and located adjacent thereto and to have both sides of the roller extend laterally beyond the reservoir.

7. A device for enabling an animal to apply liquid to its skin including a liquid holding trough, a roller structure for transferring liquid from the trough to the skin of an operating animal and overhanging both longitudinal sides of the trough, and a reservoir having means for supplying liquid to the trough to automatically maintain the level of the liquid in the trough substantially constant.

8. A device for enabling an animal to apply liquid to its skin including a liquid holding trough, a roller structure for transferring liquid from the trough to the skin of an operating animal and overhanging both longitudinal sides of the trough, and a reservoir having means for supplying liquid to the trough and for automatically maintaining the level substantially constant, said reservoir located at one end of the trough.

9. A device for enabling an animal to apply liquid to its skin including a liquid holding trough, a roller structure for transferring liquid from the trough to the skin of an operating animal and overhanging both longitudinal sides of the trough, and a reservoir having means for supplying liquid to the trough and for automatically maintaining the level substantially constant, said reservoir being located at one end of the trough in alinement therewith.

10. A device for enabling an animal to apply liquid to its skin including a liquid holding trough, a roller structure for transferring liquid from the trough to the skin of an operating animal, the roller being supported with only a relatively small part thereof dipping into the trough and the liquid therein and overhanging a longitudinal side portion of the trough, in combination with a reservoir having means for supplying liquid to the trough to automatically maintain the level of the liquid in the trough substantially constant.

11. A device for enabling an animal to apply liquid to its skin, including a liquid holding trough, a roller structure for transferring liquid from the trough to the skin of an operating animal, and a reservoir provided with a lower discharge opening in communication with the trough space and terminating at a level at which the liquid is to be maintained in the trough to afford a barometric feed, the reservoir being of lesser width than the roller and located to have both sides of said roller extend beyond the reservoir.

12. A device for enabling an animal to apply liquid to its skin including a liquid holding trough, a roller structure for transferring liquid from the trough to the skin of an operating animal and overhanging both longitudinal sides of the trough, and a reservoir provided with a lower discharge opening in communication with the trough space and terminating at a level at which the liquid is to be maintained in the trough to afford a barometric feed, the reservoir being of lesser width than the roller and located to have the side portions of the roller extend beyond the reservoir.

13. A device for enabling an animal to apply liquid to its skin including a liquid holding trough, a roller structure overhanging both longitudinal sides of the trough for transferring liquid from the trough to the skin of an operating animal, and a reservoir located at one end of the trough and provided with a lower discharge opening in communication with the trough space and terminating at a level at which the liquid is to be maintained in the trough to afford a barometric feed.

14. A device for enabling an animal to apply liquid to its skin including a liquid holding trough, a roller structure for transferring liquid from the trough to the skin of an operating animal and overhanging a longitudinal side portion of the trough, in combination with a reservoir having means for supplying liquid to the trough automatically and maintaining it at a substantially constant level, said reservoir being located at one end of the roller.

15. A device for enabling an animal to apply liquid to its skin including a liquid holding trough, a structure for transferring liquid from the trough to the skin of an operating animal, said structure having a curved surface adapted for engagement by the animal and overhanging the trough in combination with a reservoir having means for automatically maintaining the level of the liquid in the trough substantially constant.

In witness whereof, I hereunto subscribe my name this 8th day of March A. D. 1915.

HARRY L. IDE.

Witnesses:
REUBEN H. BRAND,
GUY H. GRANT.

Copies of this patent may be obtained for five cents each, by addressing the "Commissioner of Patents, Washington, D. C."